June 10, 1941.   P. F. ROSSMANN   2,245,227
HYDRAULIC PUMP AND VALVE
Filed Dec. 15, 1937   3 Sheets-Sheet 1
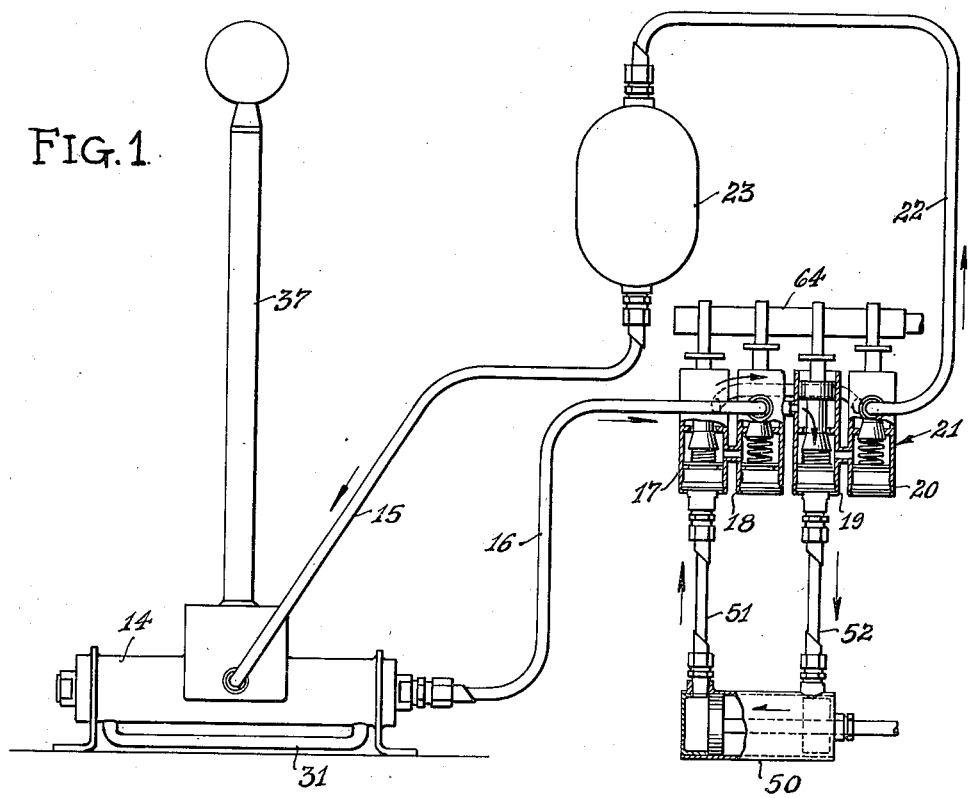
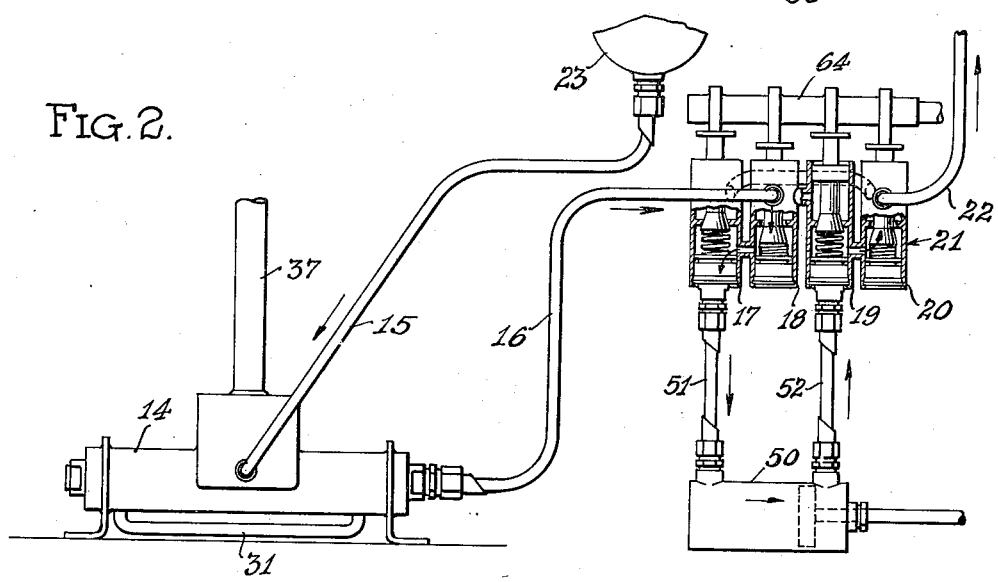
INVENTOR
PETER F. ROSSMANN.
BY
ATTORNEY

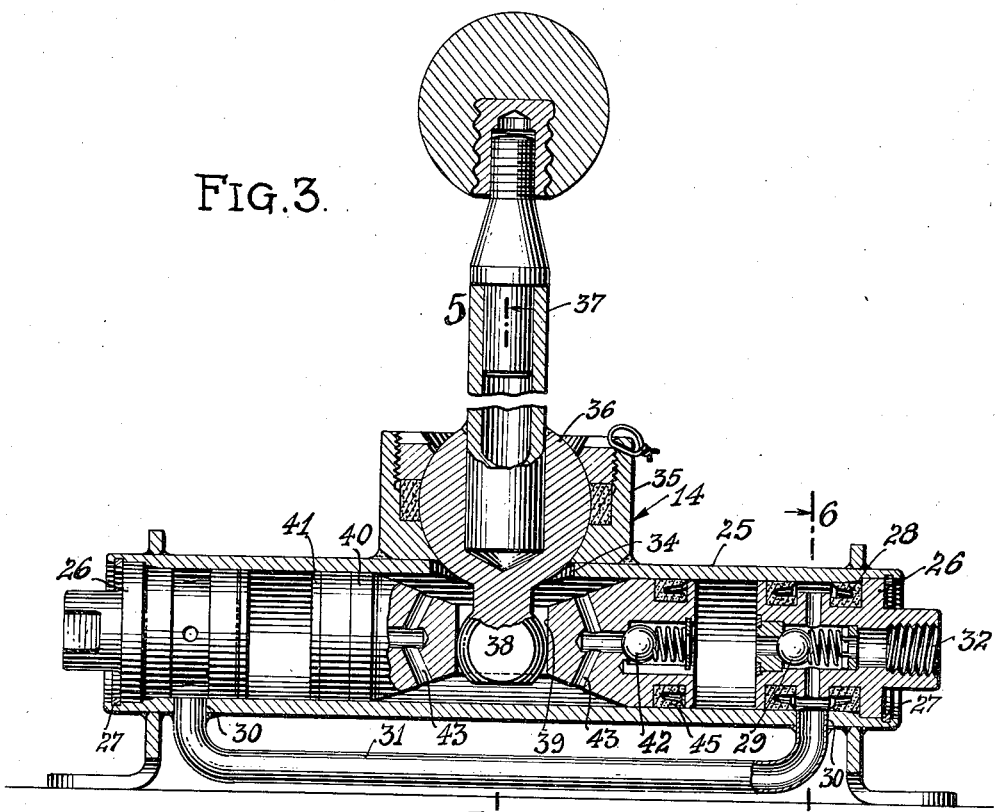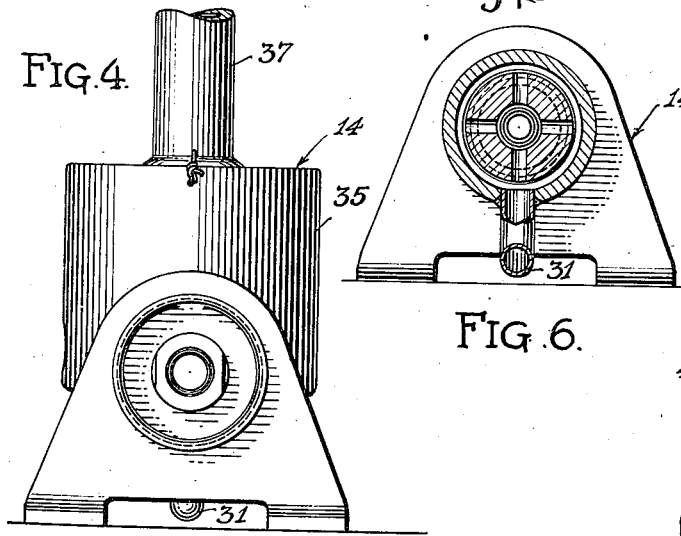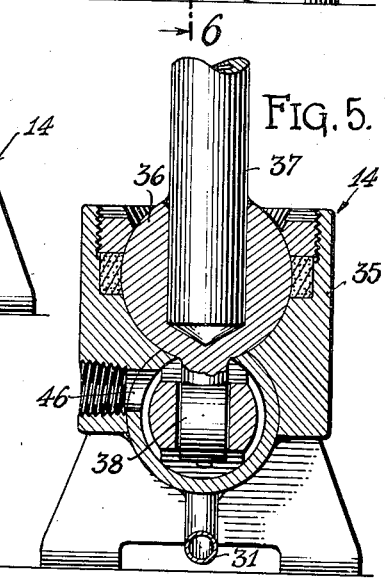

June 10, 1941.   P. F. ROSSMANN   2,245,227
HYDRAULIC PUMP AND VALVE
Filed Dec. 15, 1937   3 Sheets-Sheet 3
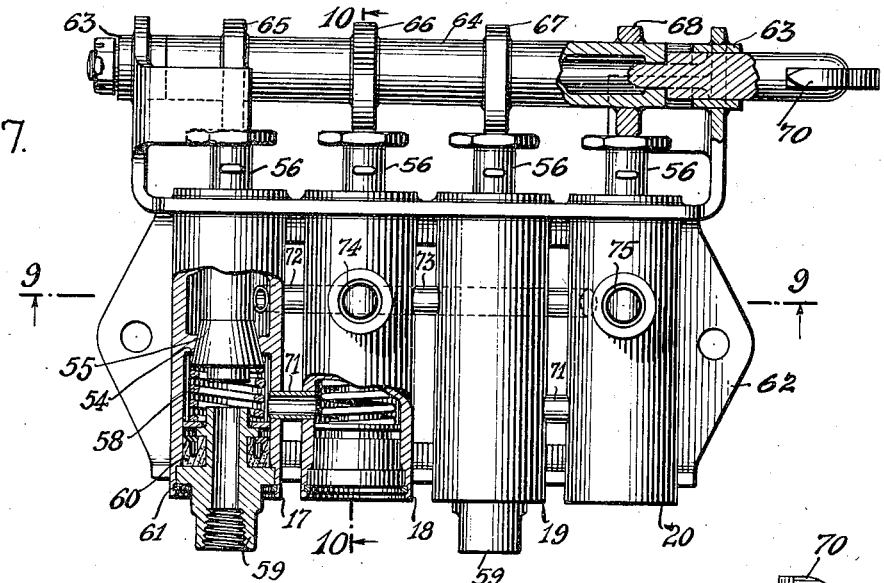
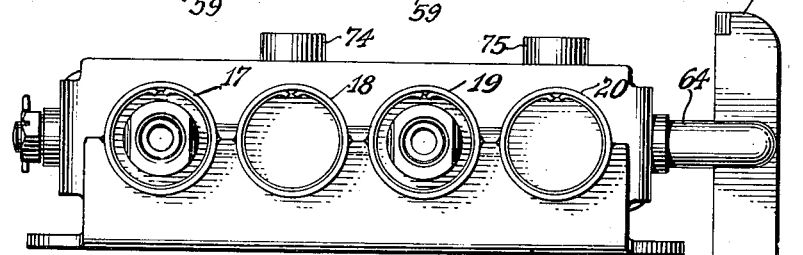
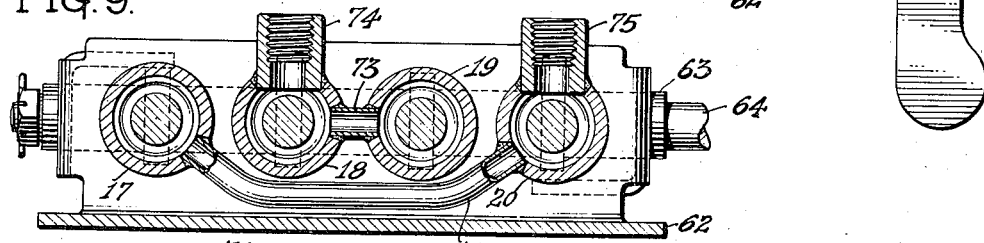
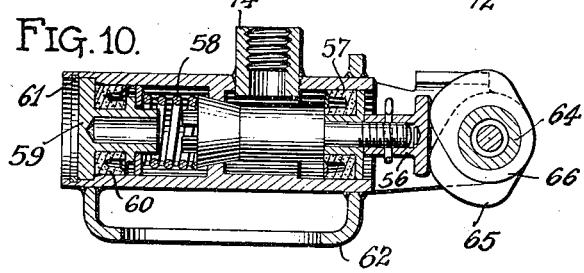
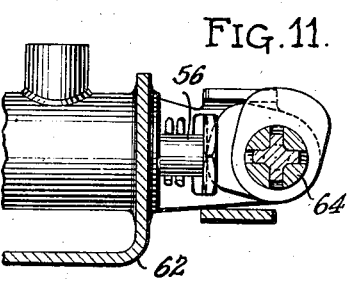
INVENTOR
PETER F. ROSSMANN.
BY
ATTORNEY Patented June 10, 1941

2,245,227

UNITED STATES PATENT OFFICE 2,245,227

HYDRAULIC PUMP AND VALVE

Peter F. Rossmann, Kenmore, N. Y., assignor to Curtiss Wright Corporation, a corporation of Delaware Application December 15, 1937, Serial No. 179,884

3 Claims. (Cl. 103—185)

This invention relates to hydraulic systems and particularly, comprises improvements in hydraulic pump and valve mechanisms of the type adapted for use in the control of aircraft accessories.

Many modern aircraft are equipped with retractable landing gears and other adjustable devices which must be controlled remotely by the aircraft crew. Hydraulic mechanisms are particularly suitable for these control functions and it is essential, under the design conditions imposed, that the system be capable of maintaining hydraulic pressures of the order of 1,000 lbs/sq. in. while holding the apparatus involved to a minimum of weight.

The present invention is concerned with a hydraulic hand pump of the reciprocating type which may be manually operated, this pump being connected with a unitary valve system by which the fluid delivered by the pump may be switched from one to another conduit connected with a hydraulic motor, whereby the operation of the hydraulic motor may be reversed. Concurrently, the unitary valve mechanism is adapted to switch the conduits of the hydraulic motor for connection to the pump intake. Objectives of the invention are to provide a pump and valve organization of great simplicity, combined with minimum weight and a maximum pressure capacity.

A further object is to provide a manually operable pump of the reciprocating type capable of fluid delivery at high pressure.

A further object is to provide a unitary valve mechanism by which fluid flow may be reversed whereby the pump delivery and pump intake may be switched between a pair of hydraulic motor conduits.

Further objects will become apparent in reading the annexed detail description in connection with the drawings in which;

Fig. 1 is an elevation, partly in section, of a hydraulic system according to the invention, showing the valves adjusted for retraction of a hydraulic motor;

Fig. 2 is a fragmentary elevation, similar to Fig. 1 showing the valves adjusted for extension of a hydraulic motor;

Fig. 3 is a longitudinal section through the pump unit;

Fig. 4 is an end elevation of the pump unit;

Fig. 5 is a section on the line 5—5 of Fig. 3;

Fig. 6 is a section on the line 6—6 of Fig. 3;

Fig. 7 is an enlarged elevation partly in section through the valve unit;

Fig. 8 is a bottom elevation of the valve unit;

Fig. 9 is a section on the line 9—9 of Fig. 7;

Fig. 10 is a section on the line 10—10 of Fig. 7, and

Fig. 11 is a fragmentary view of part of the valve assembly.

Referring to Figs. 1 and 2, I show a hydraulic reciprocating pump 14 having an intake duct 15 connected to the middle thereof and a pressure duct 16 connected to an end thereof. The pressure duct connects with a valve cylinder 18, being one of four substantially similar valve cylinders 17, 18 19 and 20 joined together and comprising a unitary valve assembly 21. As shown, the valve cylinder 20 is connected by a conduit 22 to a fluid reservoir 23 in turn, connected to the pump intake conduit 15.

Referring now to Figs. 3 to 6 inclusive, the pump unit 14 is shown in detail, this comprising a cylinder 25 having similar end plugs 26 retained by split rings 27 engaging grooves in the cylinder ends. The plugs 26 carry opposed pressure packings 28 to seal the cylinder against leakage, and likewise, are provided with a ball check valve permitting outflow of fluid from the cylinder and preventing inflow. The wall of the cylinder 25 is drilled as at 30 to communicate with the delivery side of the valves 29, the drillings 30 being interconnected by a tube 31. One of the plugs 26 is provided with an outlet opening 32 to which the delivery conduit 16 may be attached. Intermediate the length of the cylinder is a transverse opening 34 adjacent which is mounted a boss 35 having a large ball socket within which is engaged a ball 36 carrying an outwardly extending operating handle 37 and an inwardly extending projection 38 having a parti-cylindrical end. The projection 38 engages in a recess 39 formed in an opposed piston unit 40 having piston heads 41 facing respective plugs 26, the piston unit 40 incorporating check valves 42 and conduits 43 permitting fluid passage from the mid-portion of the cylinder 25 into the chambers defined between respective sets of piston heads 41 and plugs 26. The piston heads are packed as at 45 to prevent fluid leakage. As shown in Fig. 5, an opening 46 is provided through the boss 35 and the cylinder 25, this being connected to the intake conduit 15.

In operation, fluid enters the pump through the opening 46 and upon oscillation of the handle 37, fluid flows alternately through the check valves 42 and upon reverse oscillation of the handle the fluid confined between the respective sets of piston heads 41 and plugs 26 is delivered past the check valves 29 into the delivery conduit 16. It will be apparent that fluid will be delivered upon each oscillating stroke of the pump so that in effect, a double acting pump is provided, delivery from which is independent of the length of the oscillating stroke of the handle 37. The leverage afforded by the length of the handle 37 makes the pump capable of delivering fluid at very high pressure without undue effort by the operator.

In Figs. 1 and 2, I show a hydraulic motor 50 comprising a piston-cylinder combination having conduits 51 and 52. When fluid pressure is imposed through the conduit 52 retraction of the motor will be effected as shown in Fig. 1, while, if fluid pressure is imposed through the conduit 51 extension of the motor will be caused as shown in Fig. 2.

The respective valve cylinders 17 to 20 inclusive are substantially similar in construction and each includes an intermediate valve seat 54 with which a poppet type valve 55 is engageable. A stem 56 of each poppet valve extends above the respective cylinder and is packed with respect to the cylinder end by a packing 57. The valve is urged toward a closing position by means of a spring 58 bearing on the valve bottom and abutting against a plug 59, packed as at 60 and retained in the cylinder by a split ring 61 engaging a groove formed in the cylinder. The several cylinders 17 to 20 inclusive are mounted in in-line arrangement upon a bracket 62, said bracket being extended at its ends to provide bearings 63 for a camshaft 64 having cams 65, 66, 67, and 68 engageable with the stems of the valves in the respective cylinders 17, 18, 19, and 20. The camshaft may be turned by means of a handle 70 at an end thereof.

Cylinders 17 and 18, and 19 and 20 are placed in communication by tubes 71 located below the valve seats 54. Cylinders 17 and 20, and 18 and 19, are placed in communication by tubes 72 and 73 entering respective cylinders above the valve seats 54. The pressure conduit 16 from the pump enters a side opening 74 in the cylinder 18, above its valve seat. The conduit 22 connects with the cylinder 20 above the valve seat through an opening 75. The conduits 51 and 52 enter the plugs 59 of the valve cylinders 17 and 19, below respective valve seats. The cams 65 and 67, operating on the valve cylinders 17 and 19, depress respective valve stems at the same time, while the cams 66 and 68 are angularly offset from the cams 65 and 67 and also are arranged to depress their co-acting valve stems at the same time. In other words, the valves of cylinders 17 and 19 will be opened while the valves of cylinders 18 and 20 are closed and vice-versa. The functioning of the valve system in connection with the pump will be apparent from Figs. 1 and 2. In Fig. 1, the camshaft 64 has been turned to open the valves of cylinders 17 and 19 while the valves of cylinders 18 and 20 are closed. Pressure fluid enters the valve cylinder 18 above the closed valve and passes to valve cylinder 19 through the tube 73, whence it passes the valve to enter the conduit 52 to effect retraction of the hydraulic motor 50. Fluid from the left side of the motor piston concurrently flows through the conduit 51 into the valve cylinder 17, whose valve is opened whereby the fluid flows on through the tube 72 to pass through the tube 22 to the reservoir 23, and thence, through the conduit 15 to the pump intake. In Fig. 2, when the camshaft is adjusted for opening of the valves in the cylinders 18 and 20, pressure fluid passes through the valve of cylinder 18 through the tube 71, and into the conduit 51 to effect extension of the motor 50. Fluid from the right side of the piston of the motor 50 passes through the tube 52 into the valve cylinder 19, through the tube 71, through the valve of the cylinder 20 and thence, into the conduit 22 and to the pump as previously explained.

It will be apparent that a plurality of valve assemblies 21 and motors may be connected to a single pump 14 so that delivery from the pump may be selectively adjusted by any one of the several valve assemblies. Camshafts on the respective assemblies may be adjusted to a neutral position as indicated in Fig. 10 whereby fluid flow is prevented, neutralizing action of the hydraulic motor connected with the assembly.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In a hydraulic pump unit comprising a cylinder having a piston reciprocable therein, the cylinder bore including similarly formed ends each having an annular shoulder toward the end and an annular groove between the shoulder and the end, a pump exit connection plug rotationally free in the bore and having an annular groove, the lands bordering the groove respectively engaging the cylinder bore and the annular shoulder, a snap ring engaging the cylinder groove locating said plug against axial displacement, opposed toroidal packings in said plug groove sealing against leakage between the plug and cylinder, said plug having an axial drilling and radial drillings communicating therewith, the radial drillings opening to the plug groove between said packings, and a conduit secured at its ends to the cylinder ends and opening to respective plug grooves.

2. In a reciprocable force pump, an open-ended cylinder having a piston therein, closures for the cylinder ends comprising female screw connections for receiving a pipe terminal, annular packings on said closures engaging the cylinder bore and allowing of relative rotation of the closures and cylinder, and means to hold said closures against axial movement, the rotational freedom of said closures permitting easy assembly of pipe ends thereto in restricted quarters.

3. In a reciprocable force pump comprising a cylinder having an open end and having an annular groove in its inside wall, a plug carrying annular packings engaging within the cylinder end said plug being rotatable in the cylinder and having a central screw receptacle adapted to be coupled to a pipe end, and a spring split ring engaged with the cylinder groove to hold the plug against axial displacement.

PETER F. ROSSMANN.